(12) United States Patent
Kurokawa et al.

(10) Patent No.: US 8,907,244 B2
(45) Date of Patent: Dec. 9, 2014

(54) WORK MEASURING METHOD, ELECTRIC DISCHARGE MACHINING METHOD, AND ELECTRIC DISCHARGE MACHINING APPARATUS

(75) Inventors: Toshiaki Kurokawa, Chiyoda-ku (JP); Hidetaka Katougi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 551 days.

(21) Appl. No.: 13/266,619

(22) PCT Filed: Apr. 28, 2009

(86) PCT No.: PCT/JP2009/058370
§ 371 (c)(1),
(2), (4) Date: Oct. 27, 2011

(87) PCT Pub. No.: WO2010/125646
PCT Pub. Date: Nov. 4, 2010

(65) Prior Publication Data
US 2012/0043303 A1     Feb. 23, 2012

(51) Int. Cl.
*B23H 7/20*      (2006.01)
(52) U.S. Cl.
CPC ........................................ *B23H 7/20* (2013.01)
USPC ........... 219/69.17; 33/503; 33/504; 219/69.2; 702/94
(58) Field of Classification Search
USPC ............ 219/69.11, 69.13, 69.16, 69.17, 69.2; 702/94, 95; 33/502, 503, 504, 556
See application file for complete search history.

(56) References Cited

U.S. PATENT DOCUMENTS

| | | | | |
|---|---|---|---|---|
| 4,610,091 A * | 9/1986 | Bertz et al. | | 33/556 |
| 4,636,960 A * | 1/1987 | McMurtry | | 700/195 |
| 4,761,891 A * | 8/1988 | Sugimura | | 33/503 |
| 4,948,934 A * | 8/1990 | Behmer | | 219/69.2 |
| 5,051,912 A * | 9/1991 | Johanson et al. | | 700/162 |
| 5,501,096 A * | 3/1996 | Stettner et al. | | 73/1.79 |
| 2008/0201005 A1* | 8/2008 | Hon et al. | | 700/109 |
| 2013/0054172 A1* | 2/2013 | Masuo et al. | | 702/94 |

FOREIGN PATENT DOCUMENTS

| | | | |
|---|---|---|---|
| JP | 61-108907 A | 5/1986 |
| JP | 63-022249 A | 1/1988 |
| JP | 63-237840 A | 10/1988 |
| JP | 08-095627 A | 4/1996 |
| JP | 2000-158238 A | 6/2000 |

* cited by examiner

*Primary Examiner* — Geoffrey S Evans
(74) *Attorney, Agent, or Firm* — Sughrue Mion, PLLC; Richard C. Turner

(57) ABSTRACT

The present invention includes steps of, determining a search starting position; setting a center position, and a first position and a second position with a distance provided therebetween; obtaining a measurement point group including measurement points of the center position, the first position, and the second position; and determining a measurement point closest to the tip portion in the measurement point group based on positions of the measurement points in a second direction and selecting a position of the measurement point in a first direction as a selected position. When the measurement point group is obtained initially after the determination of the search starting position, the search starting position is set as the center position; and when the measurement point group is obtained after the selection of the selected position, the selected position is set as the center position. The distance is narrowed for every selection of the selected position.

11 Claims, 12 Drawing Sheets

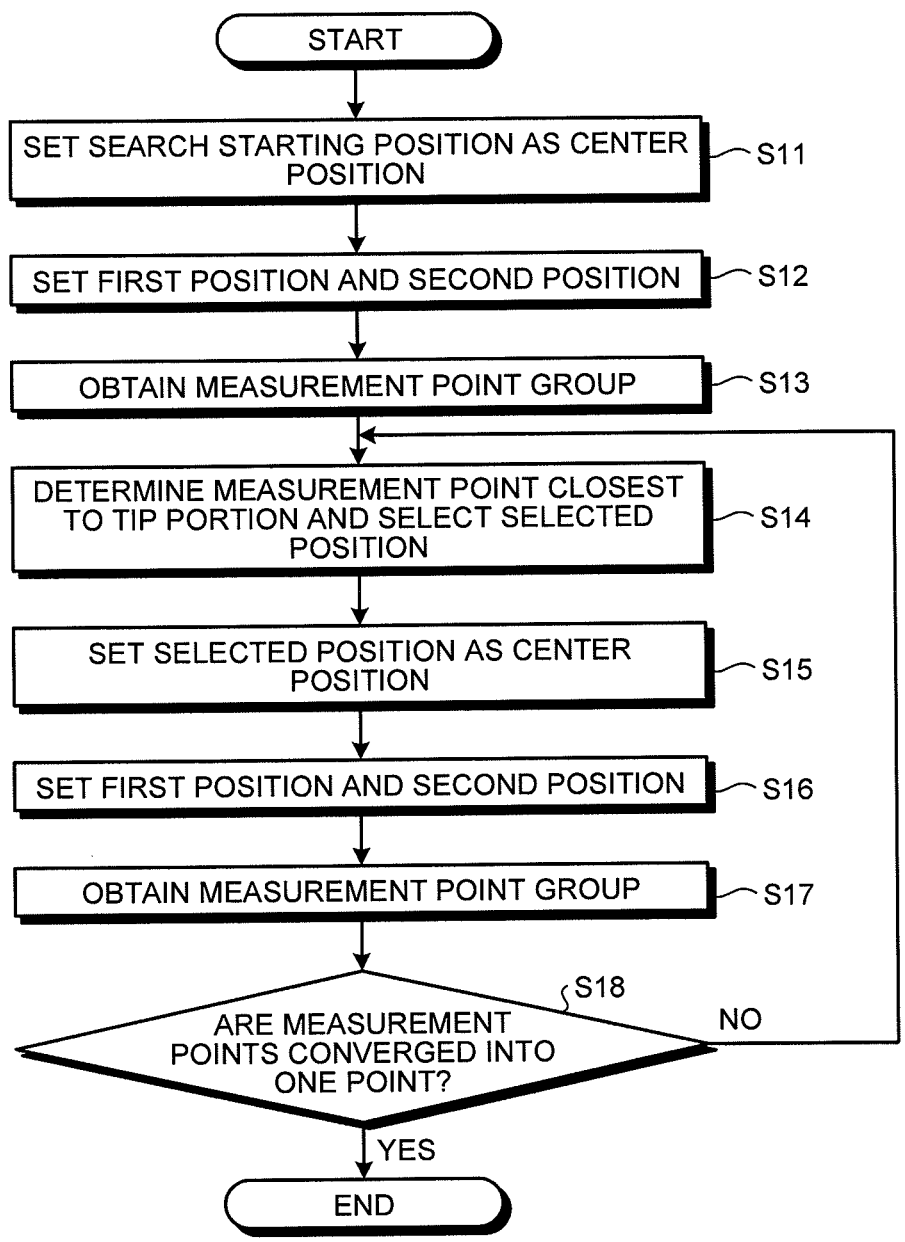

FIG.9

| θ | REMOVAL FAILURE AMOUNT | ORBIT CORRECTION AMOUNT | ORBIT SPEED WEIGHTING | ORBIT END DETERMINATION POSITION |
|---|---|---|---|---|
| 18° | 5 μm | 3 μm | 3 | 3 μm |
| 90° | 10 μm | 6 μm | 5 | 6 μm |
| 162° | ... | ... | ... | ... |
| 234° | ... | ... | ... | ... |
| 306° | 1 μm | 0.6 μm | 0.1 | 0.6 μm |

WORK MEASURING METHOD, ELECTRIC DISCHARGE MACHINING METHOD, AND ELECTRIC DISCHARGE MACHINING APPARATUS

This application is a National Stage of International Application No. PCT/JP2009/058370 filed Apr. 28, 2009, the contents of all of which are incorporated herein by reference in their entirety.

FIELD

The present invention relates to a work measuring method, an electric discharge machining method, and an electric discharge machining apparatus, and more particularly to a work measuring method for additional machining of a work.

BACKGROUND

In machining by a machine tool, the machining accuracy is, in many cases, checked by shape measurement of a work after the machining. For example, in a case where a work is transferred from a machine tool onto a measuring instrument to perform shape measurement, when it is determined that additional machining is necessary as a result of the measurement, the work is returned from the measuring instrument to the machine tool. If required setup to be performed again such as the positioning of the work in the machine tool is complicated, a great amount of effort is required in order to reproduce the installation accuracy of the work. Alternatively, in most of the cases where shape measurement is performed on a machine tool, for example, a contact-type measuring element attached to a spindle of the machine tool is used for a fixed work. In such a case, as the shape of the work becomes more complicated, greater amounts of effort and time are required for the creation of a measurement program or for manual measurement. Also in a case of a die sinking electric discharge machining apparatus, similar problems occur in shape measurement on the machine. Particularly, as the shape of a work becomes more complicated, it becomes more difficult to perform measurement to create a program for additional machining or to calculate a difference between the target shape and the measured shape. For example, in Patent Literature 1, a technique for automatically measuring the position of a concave portion formed in a work has been proposed. In such a technique, a measuring operation such that a measuring element is brought into contact with a surface of the work on which the concave portion is formed with a predetermined pitch and the measuring element is moved in a depth direction of the concave portion at the central portion of the concave portion is performed.

CITATION LIST

Patent Literature

Patent Literature 1: Japanese Patent Application Laid-open No. 63-022249

SUMMARY

Technical Problem

For example, in order to create a program for additional machining, it is necessary to obtain a removal failure amount for a target shape as accurate data. In a case where a central portion of a concave portion is uniformly determined as an object to be measured, measurement data about the shape of a portion other than the central portion of the concave portion cannot be obtained. For example, if a deepest portion (tip portion) at which machining has progressed most in the concave portion is located in a portion other than the central portion of the concave portion, it is very difficult to figure out how much additional machining is required in which direction unless the position and depth of the deepest portion can be obtained as data.

The present invention has been made in view of the above, and an object of the present invention is to obtain a work measuring method capable of highly accurately and easily measuring a shape of a work, an electric discharge machining method capable of realizing highly accurate additional machining, and an electric discharge machining apparatus.

Solution to Problem

In order to solve the above-mentioned problem and achieve the object, there is provided a method for measuring a shape of a work in two-dimensional directions including a first direction and a second direction substantially vertical to the first direction, comprising the steps of, with respect to the work having a shape including at least one of a concave shape and a convex shape including a tip portion in the two-dimensional directions, determining a search starting position from which search for the tip portion by a measuring element is started in the first direction, setting a center position, setting a first position and a second position arranged in a row in the first direction with the center position interposed therebetween as a center to have a distance provided therebetween, obtaining a measurement point group including measurement points of the center position, the first position, and the second position wherein the measurement point is a position of the measuring element when the measuring element abuts against the work, and determining a measurement point closest to the tip portion in the measurement point group based on positions of the measurement points in the second direction and selecting a position of the said measurement point in the first direction as a selected position, wherein when the measurement point group is obtained initially after the determination of the search starting position, the search starting position is set as the center position, and when the measurement point group is obtained after the selection of the selected position, the selected position is set as the center position, and the distance is narrowed for every selection of the selected position, whereby the measurement points included in the measurement point group are converged.

Advantageous Effects of Invention

According to the present invention, by converging measurement points by a simple operation of inputting a measurement parameter, the position of the tip portion in two-dimensional directions can be measured highly accurately and easily. Accordingly, there is obtained an effect of being able to measure a shape of a work highly accurately and easily.

BRIEF DESCRIPTION OF DRAWINGS

FIG. 4-1 is a cross sectional pattern diagram illustrating a process of moving a measuring element with respect to a concave shape of a work.

FIG. 4-2 is a cross sectional pattern diagram illustrating a process of moving the measuring element with respect to the concave shape of the work.

FIG. 4-3 is a cross sectional pattern diagram illustrating a process of moving the measuring element with respect to the concave shape of the work.

FIG. 4-4 is a cross sectional pattern diagram illustrating a process of moving the measuring element with respect to the concave shape of the work.

FIG. 4-5 is a cross sectional pattern diagram illustrating a process of moving the measuring element with respect to the concave shape of the work.

FIG. 4-6 is a cross sectional pattern diagram illustrating a process of moving the measuring element with respect to the concave shape of the work.

FIG. 4-7 is a cross sectional pattern diagram illustrating a process of moving the measuring element with respect to the concave shape of the work.

FIG. 4-8 is a cross sectional pattern diagram illustrating a process of moving the measuring element with respect to the concave shape of the work.

FIG. 4-9 is a cross sectional pattern diagram illustrating a process of moving the measuring element with respect to the concave shape of the work.

FIG. 5 is a flow chart illustrating a procedure for searching a tip portion from a search starting position by the tip portion search means.

FIG. 6-1 is a cross sectional pattern diagram illustrating a process of moving the measuring element with respect to the concave shape of the work.

FIG. 6-2 is a cross sectional pattern diagram illustrating a process of moving the measuring element with respect to the concave shape of the work.

FIG. 6-3 is a cross sectional pattern diagram illustrating a process of moving the measuring element with respect to the concave shape of the work.

FIG. 7 is a conceptual diagram illustrating calculation of additional machining data by an additional machining data calculation means.

FIG. 8 is a diagram showing a display example of additional machining data by a display means.

FIG. 9 is a diagram showing an example of additional machining data and correction parameters for creating an additional machining program.

DESCRIPTION OF EMBODIMENTS

An embodiment of a work measuring method, an electric discharge machining method, and an electric discharge machining apparatus according to the present invention will be described blow in detail with reference to the drawings.

Embodiment

Figure 1:
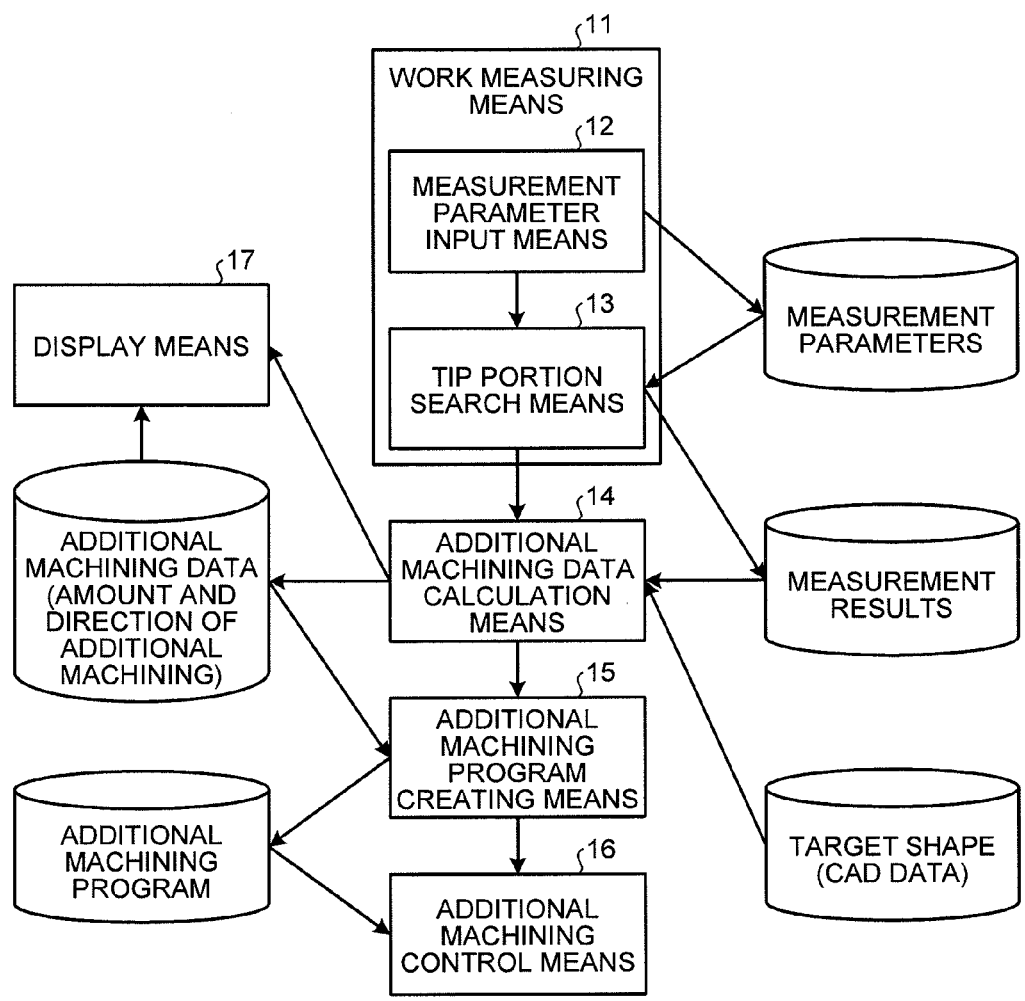
FIG. 1 is a block configuration diagram of characteristic portions of an electric discharge machining apparatus according to an embodiment.

FIG. 1 is a block configuration diagram of characteristic portions of an electric discharge machining apparatus according to an embodiment of the present invention. The electric discharge machining apparatus according to the present embodiment is a die sinking electric discharge machining apparatus. In the present embodiment, a work shape is measured on a surface plate to which a work is fixed upon electric discharge machining. A contact-type measuring element is used for the measurement of the work shape. When measuring the work shape, the measuring element is attached to a spindle of the electric discharge machining apparatus. At least one of a concave shape and a convex shape is formed in the work. The work whose shape is measured in the present embodiment has a shape including at least one of a concave shape and a convex shape having a tip portion in two-dimensional directions, and additional machining is performed thereon in accordance with the measurement results.

A work measuring means 11 includes a measurement parameter input means 12 and a tip portion search means 13. The work measuring means 11 measures the shape of a work subjected to electric discharge machining by the electric discharge machining apparatus. The measurement parameter input means 12 accepts inputs of measurement parameters for measuring the shape of the work. The tip portion search means 13 searches the tip portion of at least one of the concave shape and the convex shape.

An additional machining data calculation means 14 calculates additional machining data for additional machining based on the measurement results by the work measuring means 11 and its target shape. The target shape is specified by using CAD data, for example. An additional machining program creating means 15 creates an additional machining program for additional machining based on the additional machining data calculated by the additional machining data calculation means 14. The additional machining data includes, for example, an amount of additional machining needed and a direction requiring additional machining. An additional machining control means 16 performs additional machining by the control by the additional machining program created by the additional machining program creating means 15. Display means 17 displays the additional machining data, or the like.

Figure 2:
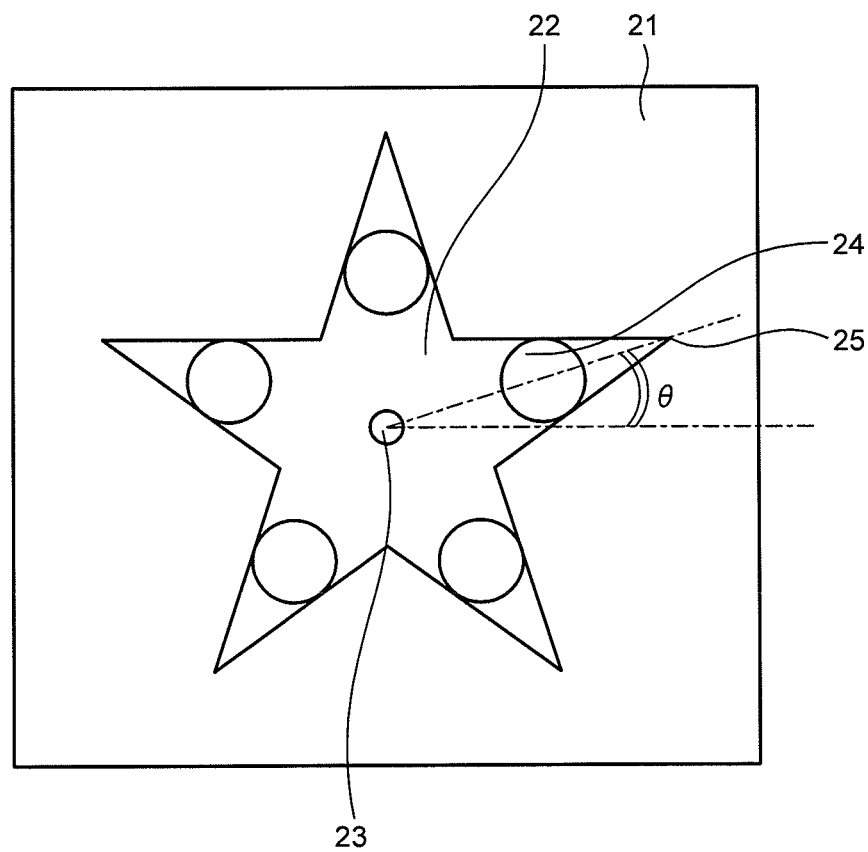
FIG. 2 is a plan schematic configuration diagram of a work.

FIG. 2 is a plan schematic configuration diagram of a work 21. The present embodiment exemplifies a case where a machined hole 22 having a star shape is formed in the work 21 by orbiting machining. The orbiting machining is a technique of electric discharge machining such that an electrode is oscillated with respect to the work 21 within a plane vertical to a machining feed direction. In the present embodiment, a circular shape is employed as an orbit shape for orbiting the electrode. The machined hole 22 having a shape similar to the shape of the electrode is formed in the work 21. A reference position 23 is generally at a center of the machined hole 22, and is the reference position of the electrode. The reference position 23 is set by using a machining program.

The shape of the machined hole 22 is configured by combining five concave shapes together in the two-dimensional directions shown in the figure. A tip portion 25 is the deepest portion in the concave shape, i.e., the farthermost position from the reference position 23 in one concave shape. An approximate measurement position 24 is a position from which measurement by the measuring element is started. In the present embodiment, the approximate measurement position 24 is specified for each concave shape.

The approximate measurement position 24 is specified by a direction from the reference position 23. A measurement parameter is a parameter indicating a direction from the reference position 23. For example, an angle θ with respect to the reference position 23 being the center is used as the measurement parameter. For example, the measurement parameter may be two-dimensional coordinates respresenting a direction from the reference position 23 as a vector. For the work 21 including a concave shape, the approximate measurement position 24 is an arbitrary position in the vicinity of the concave shape in the machined hole 22.

Now, a procedure for measuring the position of the tip portion 25 of the concave shape in a work measuring process of measuring the work 21 is described. When the approximate measurement position 24 is specified by the measurement parameter, the measuring element is moved from the approximate measurement position 24 in accordance with a measurement program. By moving the measuring element, a search starting position from which search for the tip portion 25 is started is determined. Next, in accordance with the measurement program, the measuring element is moved from the search starting position to measure the position of the tip portion 25.

Figure 3:
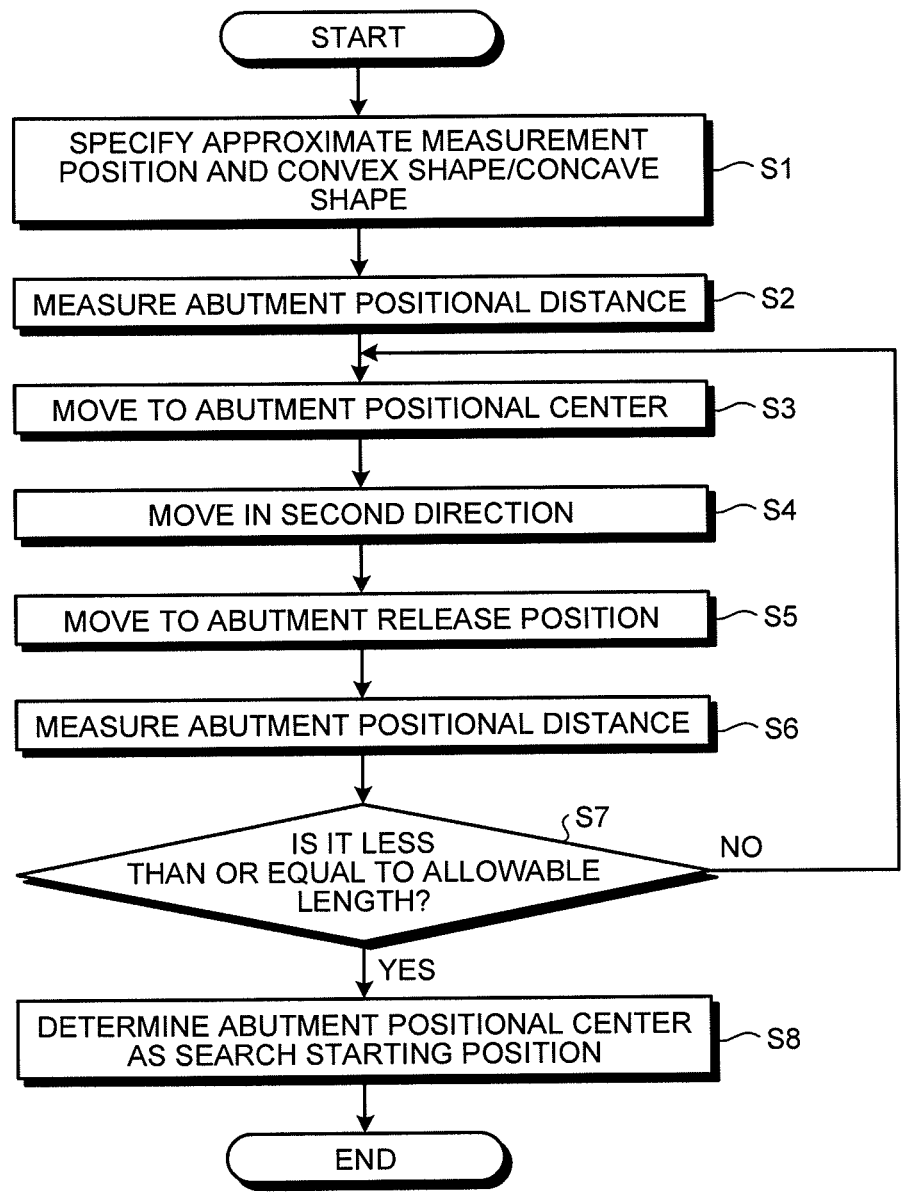
FIG. 3 is a flow chart illustrating a procedure up to determination of a search starting position by a tip portion search means.

FIG. 3 is a flow chart illustrating a procedure up to determination of the search starting position by the tip portion search means 13. FIGS. 4-1 to 4-9 are cross sectional pattern diagrams illustrating processes of moving the measuring element with respect to the concave shape of the work 21. In step S1, the approximate measurement position 24 (see FIG. 2) and which one of the concave shape and the convex shape is to be measured are specified. The measurement parameter for specifying the approximate measurement position 24 may be inputted by any method. For example, the measurement parameter is inputted by an input operation by an operator, or by acquisition from CAD data.

Herein, an axis connecting between the reference position 23 and the approximate measurement position 24 is defined as a Y-axis, and an axis generally vertical to the Y-axis is defined as an X-axis. The X-axis and Y-axis both are axes included in the two-dimensional directions for measuring the shape of the work 21. The X-axis direction (first direction) approximately coincides with a width direction of the concave shape, and it is a direction of moving the measuring element for searching the position of the tip portion 25 in the width direction. The Y-axis direction (second direction) approximately coincides with a depth direction of the concave shape, and it is a direction of moving the measuring element for searching the position of the tip portion 25 in the depth direction.

Figures 1, 4:
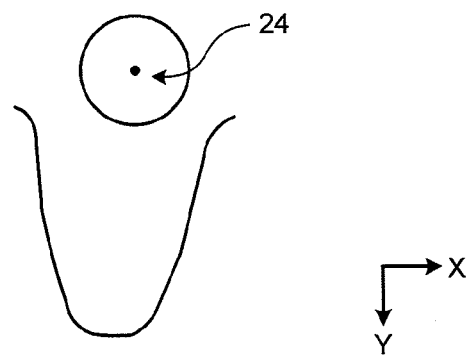
Figures 2, 4:
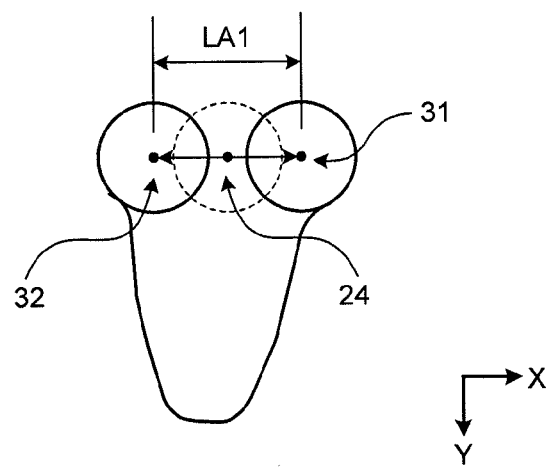
Figures 3, 4:
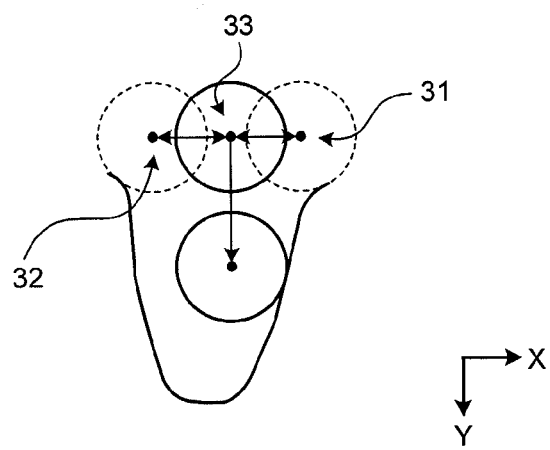
Figure 4:
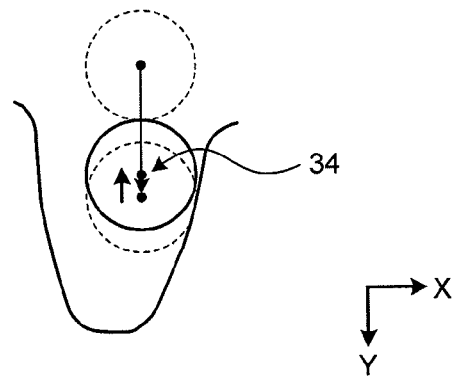

When it is specified that the object to be measured has a concave shape and the approximate measurement position 24 is at an arbitrary position in the vicinity of the concave shape, the measuring element is set at a position such that the approximate measurement position 24 is placed as a center. In step S2, an abutment positional distance LA1 obtained initially after the specification of the approximate measurement position 24 is measured. As shown in FIG. 4-2, in order to measure the abutment positional distance LA1, the measuring element is moved toward a side (first side) in the X-axis arrow direction and toward a side (second side) in an opposite direction to the arrow. The abutment positional distance LA1 is a distance between a first abutment position 31 and a second abutment position 32. The first abutment position 31 is a position of the measuring element obtained by moving the measuring element toward the first side in the X-axis direction from the approximate measurement position 24 as a predetermined position until the measuring element abuts against the work. The second abutment position 32 is a position of the measuring element obtained by moving the measuring element toward the second side from the approximate measurement position 24 until the measuring element abuts against the work. Note that the position of the measuring element refers to a center position of the measuring element.

In step S3, the measuring element is moved to an abutment positional center 33. As shown in FIG. 4-3, the abutment positional center 33 is the center of the abutment positional distance LA1 between the first abutment position 31 and the second abutment position 32. In step S4, the measuring element is moved toward the Y-axis direction (second direction) from the abutment positional center 33. The measuring element is moved in an arrow direction of the Y-axis until it abuts against the work. In step S5, as shown in FIG. 4-4, the measuring element is moved to an abutment release position 34. The abutment release position 34 is a position at which the abutment between the measuring element and the work is released, and is a position obtained by slightly moving the measuring element in an opposite direction to the arrow of the Y-axis from the state where the measuring element abuts against the work.

Figures 4, 5:
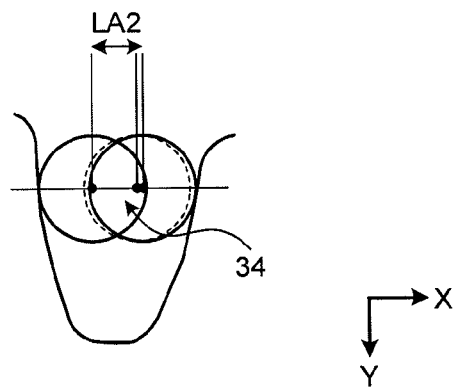

In step S6, as shown in FIG. 4-5, an abutment positional distance LA2 after the measuring element is moved to the abutment release position 34 is measured. The abutment positional distance LA2 is measured by moving the measuring element in the X-axis direction from the abutment release position 34 as a predetermined position. The movement of the measuring element in the X-axis direction is similar to that in step S3. In step S7, it is determined whether the abutment positional distance LA2 measured in step S6 is less than or equal to an allowable length. The allowable length is a minimum length capable of stably measuring the abutment positional distance LA2, and is 100 μm, for example. The allowable length can be suitably set in accordance with typically conceivable roughness of the electric discharge machined surface, for example.

Figures 4, 5, 6:
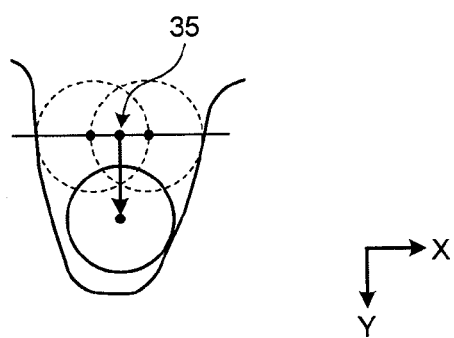

Here, suppose that the abutment positional distance LA2 has been determined to be greater than the allowable length (step S7, No). In such a case, the process returns to step S3, and the measuring element is moved to an abutment positional center 35 in the abutment positional distance LA2, as shown in FIG. 4-6. In step S4, the measuring element is moved in the Y-axis direction from the abutment positional center 35 until it abuts against the work. In step S5, the measuring element is moved to an abutment release position 36 as shown in FIG. 4-7.

In step S6, as shown in FIG. 4-8, an abutment positional distance LA3 is measured by moving the measuring element in the X-axis direction from the abutment release position 36. In step S7, it is determined whether the abutment positional distance LA3 measured in step S6 is less than or equal to the allowable length. Here, suppose that the abutment positional distance LA3 has been determined to be less than or equal to the allowable length (step S7, Yes). In such a case, in step S8, it is determined that, in the X-axis direction, an abutment positional center in the abutment positional distance LA3 is the search starting position. If the abutment positional distance LA3 has been determined to be greater than the allowable length (step S7, No), the procedure from step S3 is repeated. As shown in FIG. 4-9, the operation for determining the search starting position is continued until the abutment positional distance is determined to be less than or equal to the allowable length.

FIG. 5 is a flow chart illustrating a procedure for searching the tip portion from the search starting position by the tip portion search means 13. FIGS. 6-1 to 6-3 are cross sectional pattern diagrams illustrating processes of moving the measuring element with respect to the concave shape of the work 21. In step S11, the search starting position determined by the above-described procedure from step S1 to step S8 is set as a center position P0 in the X-axis direction as shown in FIG. 6-1.

In step S12, a first position P1 and a second position P2 are set. The first position P1 and the second position P2 are arranged in a row in the X-axis direction with the center position P0 interposed therebetween as a center. The first position P1 and the second position P2 are set to have a distance LB1 provided therebetween. Suppose that the distance LB1 is equal to the abutment positional distance when the search starting position is determined.

In step S13, a measurement point group is initially obtained after the determination of the search starting position. A measurement point is a position of the measuring element when the measuring element abuts against the work. Measurement points 41, 42, and 43 are measured by moving the measuring element in the Y-axis direction at the center position P0, the first position P1, and the second position P2 respectively so that the measuring element abuts against the work. In such a manner, the measurement point group consisting of the three measurement points 41, 42, and 43 is obtained.

In step S14, a measurement point closest to the tip portion in the measurement point group is determined, and the position of the measurement point in the X-axis direction is selected as a selected position. The measurement point closest to the tip portion in the measurement point group is determined based on the positions of the measurement points in the Y-axis direction. According to an example shown in FIG. 6-1, among the measurement points 41, 42, and 43 in the measurement point group, it is determined that the measurement point 41 farthest away from the reference position 23 (see FIG. 2) in the Y-axis direction is the closest to the tip portion. As the selected position, the position P0, which is the position of the measurement point 41 in the X-axis direction, is selected. Note that when an object to be measured has a convex shape, it is determined that a measurement point closest to the reference position 23 in the Y-axis direction is the closest to the tip portion.

In step S15, as shown in FIG. 6-2, the position P0 selected as the selected position is set to be the center position in the X-axis direction. In step S16, a first position P3 and a second position P4 are set. The first position P3 and the second position P4 are arranged in a row in the X-axis direction with the center position P0 interposed therebetween as a center. The first position P3 and the second position P4 are set to have a distance LB2 provided therebetween. The distance LB2 is a length corresponding to a half of the distance LB1 in step S12.

In step S17, a measurement point group after the selection of the selected position is obtained. Measurement points 44 and 45 are measured by moving the measuring element in the Y-axis direction respectively at the first position P3 and the second position P4 so that the measuring element abuts against the work. The measurement point 41 about the center position P0 has already been measured in step S13. In such a manner, the measurement point group consisting of the three measurement points 41, 44, and 45 is obtained.

In step S18, it is determined whether or not the three measurement points 41, 44, and 45 obtained as the measurement point group converge into one point. Whether or not the measurement points in the measurement point group converge into one point is determined, for example, based on whether or not a difference between X-Y coordinates of the measurement points is less than or equal to the smallest unit. The smallest unit refers to a detection limit value capable of detecting a positional difference by measurements.

Here, suppose that since the difference between X-Y coordinates of the three measurement points 41, 44, and 45 is greater than the smallest unit, the measurement points 41, 44, and 45 are determined not to converge into one point (step S18, No). In such a case, the process returns to step S14, a measurement point closest to the tip portion in the measurement point group is determined, and the position of the measurement point in the X-axis direction is selected as a selected position. According to an example shown in FIG. 6-2, among the measurement points 41, 44, and 45 in the measurement point group, it is determined that the measurement point 44 farthest away from the reference position 23 in the Y-axis direction is the closest to the tip portion. As the selected position, the position P3, which is the position of the measurement point 44 in the X-axis direction, is selected.

In step S15, as shown in FIG. 6-3, the position P3 selected as the selected position is set to be the center position in the X-axis direction. In step S16, a first position P5 and a second position P6 are set. The first position P5 and the second position P6 are arranged in a row in the X-axis direction with the center position P3 interposed therebetween as a center. The first position P5 and the second position P6 are set to have a distance LB3 provided therebetween. The distance LB3 is a length corresponding to a half of the distance LB2 in the previous step S12.

In step S17, a measurement point group is obtained. Measurement points 46 and 47 are measured by moving the measuring element in the Y-axis direction at the first position P5, and the second position P6 respectively so that the measuring element abuts against the work. The measurement point 44 about the center position P3 has already been measured in the previous step S17. In such a manner, the measurement point group consisting of the three measurement points 44, 46, and 47 is obtained.

In step S18, it is determined whether or not the three measurement points 44, 46, and 47 obtained as the measurement point group converge into one point. Here, suppose that the three measurement points 44, 46, and 47 have been determined to converge into one point (step S18, Yes). In such a case, it is determined that the one point into which the three measurement points 44, 46, and 47 are converged is the tip portion, and the search for the tip portion is ended. If the three measurement points 44, 46, and 47 are determined not to converge into one point (step S18, No), the procedure from step S14 is repeated. Until three measurement points obtained as a measurement point group are determined to converge into one point, the operation for searching the tip portion is continued. As described above, every time a selected position is selected, a distance between the first position and the second position is narrowed, whereby the measurement points included in the measurement point group are converged.

As described above, by a simple operation of inputting a measurement parameter, the tip portion of a concave shape is automatically searched. By searching the tip portion for each concave shape, the shape of the work 21 (see FIG. 2) is measured. By converging measurement points included in a measurement point group, the position of the tip portion in two-dimensional directions can be measured highly accurately and easily. Thus, there is obtained an effect of being able to measure the shape of the work highly accurately and easily. Further, it becomes possible to obtain a high measurement accuracy with a fewer number of times of measurement.

Figures 4, 5, 6, 7:
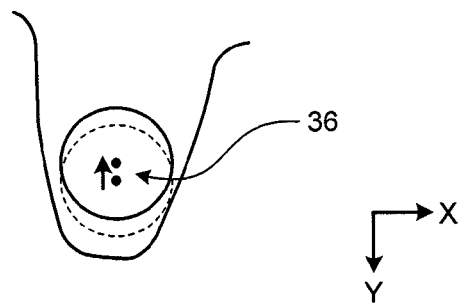

FIG. 7 is a conceptual diagram illustrating calculation of additional machining data by the additional machining data calculation means 14 (see FIG. 1). For example, suppose that a tip portion 52 in an angle θ with respect to the reference position 23 (see FIG. 2) being the center is closer to the reference position 23 by Δd with respect to a target shape 51. In this case, about the angle θ, a difference between the measured shape and the target shape 51 is calculated as a removal failure amount Δd. The additional machining data calculation means 14 calculates additional machining data based on the difference between the target shape 51 of the electric discharge machining and the measured shape.

Figures 4, 5, 6, 7, 8:
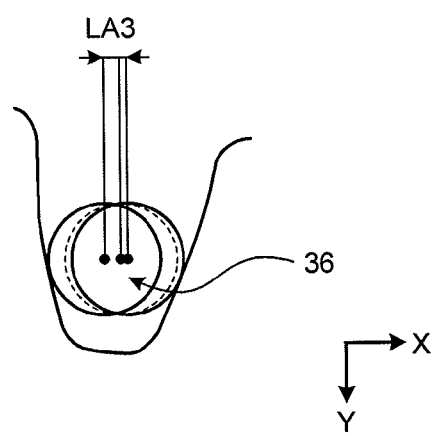

FIG. 8 is a diagram showing a display example of additional machining data by the display means 17 (see FIG. 1). In the present embodiment, the shape of the work 21 is measured regarding five directions equally dividing 360° of an orbit shape 55 having a circular shape into five. In this example, removal failure amounts calculated for those directions are connected with line segments, and a portion between a pentagon formed by such line segments and the orbit shape 55 is graphically displayed as a removal failure portion 56. The removal failure portion 56 represents amounts of additional machining needed and directions requiring additional machining. By displaying the removal failure portion 56 as a visual information, an operator can easily recognize the amounts of additional machining and the directions thereof. Accordingly, it becomes possible to perform an appropriate correction for obtaining a shape close to the target shape by additional machining, for example, a correction of orbit machining, a correction of liquid treatment, or the like.

Figures 4, 5, 6, 7, 8, 9:
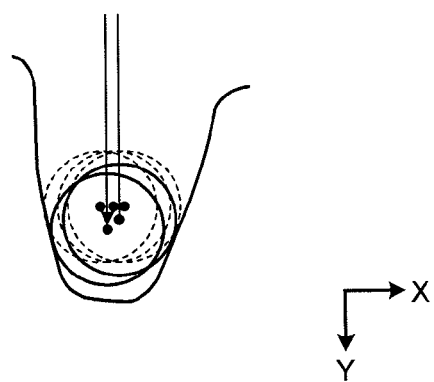
Figures 1, 6:
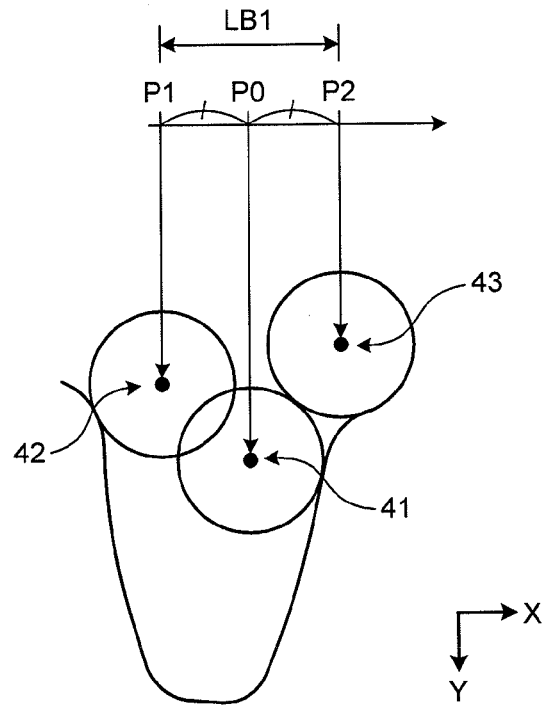
Figures 2, 6:
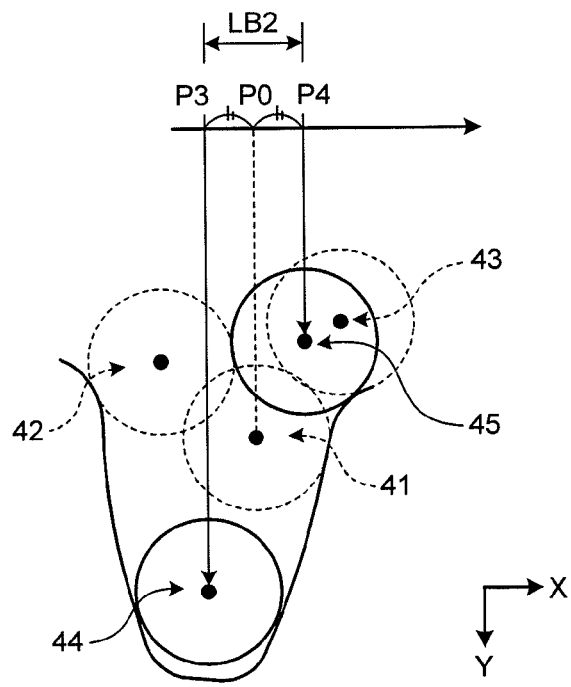
Figures 3, 6:
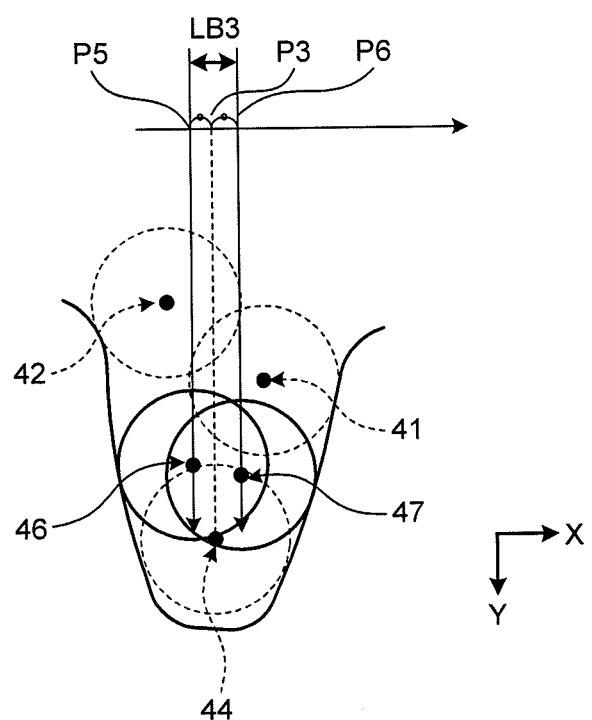
Figure 7:
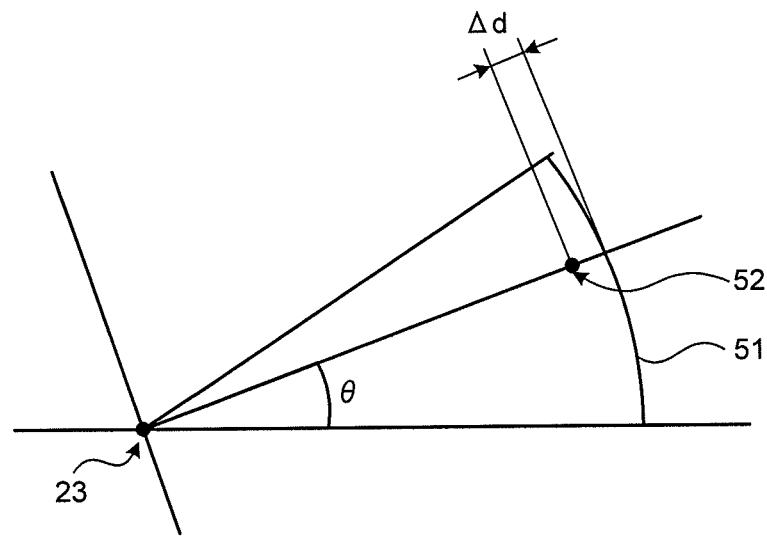
Figure 8:
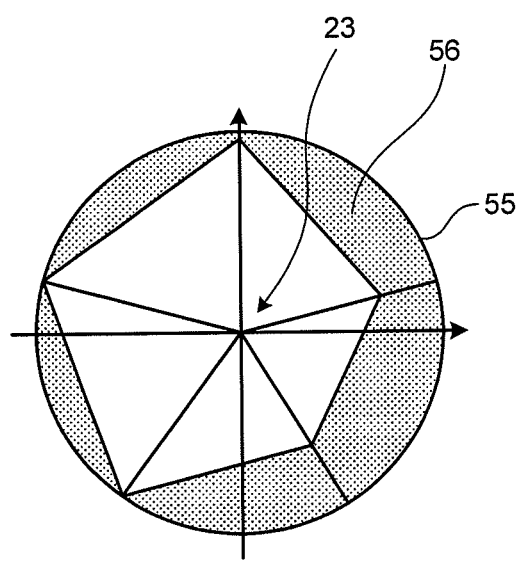

FIG. 9 is a diagram showing an example of additional machining data and correction parameters for creating an additional machining program. A table shown in the figure is displayed by the display means 17, for example. In this example, removal failure amounts calculated by the additional machining data calculation means 14 regarding θ=18°, 90°, 162°, 234°, and 306° are displayed. Each θ is set by equally dividing 360° into five in conformity with acute-angled portions of the star shape of the machined hole 22 (see FIG. 2). The correction parameters are parameters for correcting various conditions upon the additional machining by the additional machining control means 16 (see FIG. 1). Herein, a case where an orbit correction amount, an orbit speed weighting, and an orbit end determination position, for example, are employed as correction parameters for each θ is described. In the table, there are provided columns for inputting orbit correction amounts, orbit speed weightings, and orbit end determination positions, together with the removal failure amounts.

Each of the orbit correction amount, orbit speed weighting, and orbit end determination position is a parameter regarding orbit of an electrode in orbit machining. The orbit correction amount represents an amount by which the position at which the electrode is oscillated is shifted in a direction away from the reference position 23 with respect to the set orbit shape. In a portion where the removal failure amount is larger, the orbit correction amount has a larger value. The orbit speed weighting represents a multiplying factor for changing the orbit speed with a standard value set as the orbit speed of the electrode being 1. In a portion where the removal failure amount is larger, the orbit speed is decreased, thereby resulting in a smaller value of the orbit speed weighting. The orbit end determination position represents a position of the electrode set as a condition for determining that the machining has accomplished the target shape. The orbit end determination position is set so that more strict determination is made in a portion where the removal failure amount is larger.

Correction parameters may be inputted by an operator in accordance with the displayed removal failure amount, or may be obtained by calculation according to the removal failure amount and inputted. The additional machining program creating means 15 (see FIG. 1) creates an additional machining program using the removal failure amounts for the directions obtained as the additional machining data and the inputted correction parameters. The additional machining control means 16 performs control of additional machining using the additional machining program thus created. The additional machining control means 16 oscillates the electrode only in an orbit direction requiring additional machining. As described above, by using the additional machining data obtained by highly accurate measurements, it is possible to perform highly accurate additional machining.

Note that correction parameters are not limited to those described in the present embodiment, and any parameter regarding orbit machining may be employed. For example, as a parameter regarding orbit end determination, an orbit end determination voltage may be employed instead of the orbit end determination position. The orbit end determination voltage is an inter-electrode voltage to be a threshold for determining that the machining has accomplished the target shape and may be represented by a rate with respect to the standard value, for example. As parameters regarding orbit end determination, both of the orbit end determination position and the orbit end determination voltage may be employed. Further, a weighting regarding at least one of the orbit end determination position and the orbit end determination voltage may be employed as a parameter.

The work measuring method and the electric discharge machining method described in the present embodiment are not limited to a case where they are applied to a die sinking electric discharge machining apparatus, and may be applied to a wire electric discharge machining apparatus, for example. Also in the wire electric discharge machining apparatus, it is possible to perform highly accurate and easy shape measurements and to perform highly accurate additional machining as in the present embodiment. In a case of the wire electric discharge machining apparatus, a wire used as an electrode may be used as a contact-type measuring element. In such a case, since replacement of the electrode with the measuring element in the spindle is not required, measurements and additional machining can be further facilitated. Further, the work measuring method described in the present embodiment may be applied to a machine tool other than an electric discharge machining apparatus.

Figure 10:
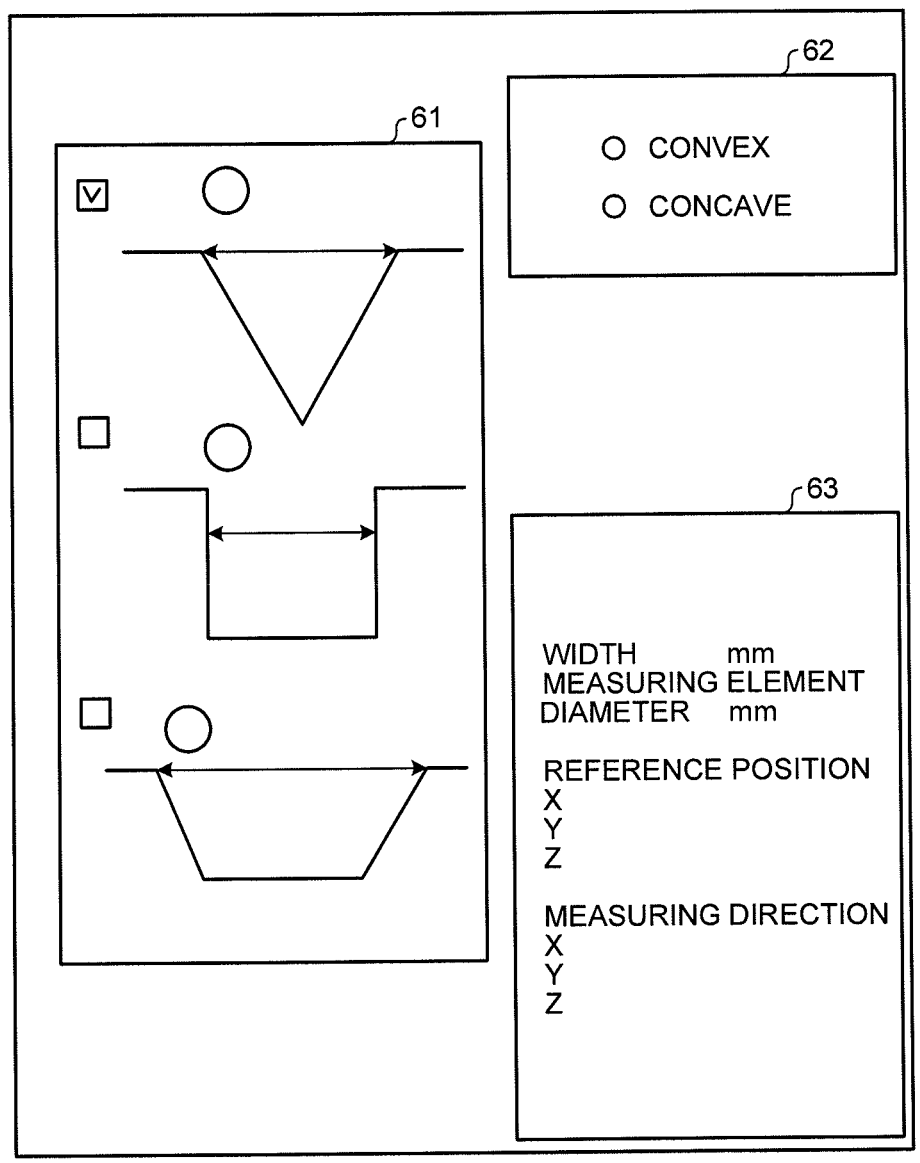
FIG. 10 is a diagram illustrating an example of entries typically considered as measurement parameters in a machine tool.

FIG. 10 is a diagram illustrating an example of entries typically considered as measurement parameters in a machine tool. Herein, there is shown a display example of an input screen for accepting inputs of measurement parameters. These entries are displayed by operating additional machining instructions, for example. An approximate shape selecting portion 61 is a portion for selecting an approximate shape to be an object to be measured. In this example, shapes, which are a triangle, a rectangle, and a trapezoid, are options for the approximate shape.

A concave or convex selecting portion 62 is a portion for selecting whether the object to be measured has a concave shape or a convex shape. A numerical value display portion 63 is a portion for displaying numerical values inputted as measurement parameters. In this example, a width, measuring element diameter, reference position (for example, X-Y-Z coordinates), and measuring direction (for example, X-Y-Z coordinates) of the shape to be the object to be measured are entries to be inputted as numerical values. By using these measurement parameters, the shape of the work is measured. Note that as described in the present embodiment, in a case of die sinking electric discharge machining involving electrode orbit, since the reference position of the electrode can be used as the reference position 23, there is no need to set a reference position for measurements.

INDUSTRIAL APPLICABILITY

As described above, the work measuring method, the electric discharge machining method, and the electric discharge machining apparatus according to the present invention are useful for a case where a work involving additional machining is shaped.

REFERENCE SIGNS LIST

11 WORK MEASURING MEANS
12 MEASUREMENT PARAMETER INPUT MEANS
13 TIP PORTION SEARCH MEANS
14 ADDITIONAL MACHINING DATA CALCULATION MEANS
15 ADDITIONAL MACHINING PROGRAM CREATING MEANS
16 ADDITIONAL MACHINING CONTROL MEANS
17 DISPLAY MEANS

The invention claimed is:

1. A method for measuring a shape of a work in two-dimensional directions including a first direction and a second direction substantially vertical to the first direction, comprising the steps of:
with respect to the work having a shape including at least one of a concave shape and a convex shape including a tip portion in the two-dimensional directions,
determining a search starting position from which search for the tip portion by a measuring element is started in the first direction;
setting a center position;
setting a first position and a second position arranged in a row in the first direction with the center position interposed therebetween as a center to have a distance provided therebetween;
obtaining a measurement point group including measurement points of the center position, the first position, and the second position wherein the measurement point is a position of the measuring element when the measuring element abuts against the work; and
determining a measurement point closest to the tip portion in the measurement point group based on positions of the measurement points in the second direction and selecting a position of the said measurement point in the first direction as a selected position, wherein
when the measurement point group is obtained initially after the determination of the search starting position, the search starting position is set as the center position, and when the measurement point group is obtained after the selection of the selected position, the selected position is set as the center position, and
the distance is narrowed for every selection of the selected position, whereby the measurement points included in the measurement point group are converged.

2. The work measuring method according to claim 1, comprising the steps of:
specifying an approximate measurement position from which measurement by the measuring element is started in the two-dimensional directions;
measuring an abutment positional distance between a first abutment position and a second abutment position wherein the first abutment position is a position of the measuring element obtained by moving the measuring element toward a first side in the first direction from a predetermined position until the measuring element abuts against the work, and the second abutment position is a position of the measuring element obtained by moving the measuring element toward a second side opposite to the first side from the predetermined position until the measuring element abuts against the work;
moving the measuring element to an abutment positional center which is a center of the abutment positional distance;
moving the measuring element in the second direction from the abutment positional center until the measuring element abuts against the work;
moving the measuring element to an abutment release position at which the abutment between the measuring element and the work is released; and
moving the measuring element in the first direction from the abutment release position to measure the abutment positional distance, wherein
in the step of initially measuring the abutment positional distance after the specification of the approximate measurement position, the approximate measurement position is set as the predetermined position; and in the step of measuring the abutment positional distance after moving the measuring element to the abutment release position, the abutment positional center is set as the predetermined position, and
the abutment positional center when the abutment positional distance is less than or equal to an allowable length is set to be the search starting position.

3. The work measuring method according to claim 2, comprising a step of inputting a measurement parameter for specifying the approximate measurement position.

4. An electric discharge machining method comprising:
a work measuring step of measuring a shape of a work having been subjected to electric discharge machining;
a step of calculating additional machining data for additional machining based on a difference between a target shape of the electric discharge machining and a measured shape measured in the work measuring step;
a step of creating an additional machining program for the additional machining based on the calculated additional machining data; and
an additional machining control step of performing the additional machining by control by the additional machining program,
the work measuring step comprising the steps of:
measuring the shape of the work in two-dimensional directions including a first direction and a second direction substantially vertical to the first direction,
with respect to the work having a shape including at least one of a concave shape and a convex shape including a tip portion in the two-dimensional directions,
determining a search starting position from which search for the tip portion by a measuring element is started in the first direction;
setting a center position;
setting a first position and a second position arranged in a row in the first direction with the center position interposed therebetween as a center to have a distance provided therebetween;
obtaining a measurement point group including measurement points of the center position, the first position, and the second position wherein the measurement point is a position of the measuring element when the measuring element abuts against the work; and
determining a measurement point closest to the tip portion in the measurement point group based on positions of the measurement points in the second direction and selecting a position of the said measurement point in the first direction as a selected position, wherein
when the measurement point group is obtained initially after the determination of the search starting position, the search starting position is set as the center position, and when the measurement point group is obtained after the selection of the selected position, the selected position is set as the center position, and the distance is narrowed for every setting of the center position, whereby the measurement points included in the measurement point group are converged.

5. The electric discharge machining method according to claim 4, wherein an electrode is oscillated in the electric discharge machining, and the electric discharge machining method comprises a step of inputting a measurement parameter for specifying an approximate measurement position with a reference position for orbiting the electrode being a reference.

6. The electric discharge machining method according to claim 4, comprising a step of displaying the difference between the target shape and the measured shape.

7. The electric discharge machining method according to claim 4, wherein an electrode is oscillated in the electric discharge machining, and the electric discharge machining method comprises a step of setting an oscillation speed for orbiting the electrode in the additional machining control step based on a measurement result in the work measuring step.

8. The electric discharge machining method according to claim 4, comprising a step of orbiting an electrode in the electric discharge machining and terminating the electrode orbit in accordance with an orbit end determination, and setting a condition for the orbit end determination in the additional machining control step based on a measurement result in the work measuring step.

9. An electric discharge machining apparatus comprising:

a processor;

a memory storing executable instructions that, when executed by the processor, causes the processor to perform the steps of:

measuring a shape of a work having been subjected to electric discharge machining to obtain a measured shape;

calculating additional machining data for additional machining based on a difference between a target shape of the electric discharge machining and the measured shape;

creating an additional machining program for the additional machining based on the additional machining data; and performing the additional machining by control by the additional machining program, wherein the measuring step comprises measuring the shape of the work in two-dimensional directions including a first direction and a second direction substantially vertical to the first direction;

with respect to the work having a shape including at least one of a concave shape and a convex shape including a tip portion in the two-dimensional directions, determining a search starting position from which search for the tip portion by a measuring element is started in the first direction;

setting a center position;

setting a first position and a second position arranged in a row in the first direction with the center position interposed therebetween as a center to have a distance provided therebetween;

obtaining a measurement point group including measurement points of the center position, the first position, and the second position respectively wherein the measurement point is a position of the measuring element when the measuring element abuts against the work; and determining a measurement point closest to the tip portion in the measurement point group based on positions of the measurement points in the second direction and selecting a position of the said measurement point in the first direction as a selected position, wherein when the measurement point group is obtained initially after the determination of the search starting position, the search starting position is set as the center position; and when the measurement point group is obtained after the selection of the selected position, the selected position is set as the center position, and the distance is narrowed for every setting of the center position, whereby the measurement points included in the measurement point group are converged.

10. The electric discharge machining apparatus according to claim 9, wherein an electrode is oscillated in the electric discharge machining, and the processor further performs the step of accepting an input of a measurement parameter for specifying an approximate measurement position with a reference position for orbiting the electrode being a reference.

11. The electric discharge machining apparatus according to claim 9, wherein the processor causes a display device to perform the step of displaying the difference between the target shape and the measured shape.

* * * * *